Oct. 12, 1943.    M. J. WEBER ET AL    2,331,642
WEIGHING SCALE
Filed Oct. 21, 1940    3 Sheets-Sheet 1
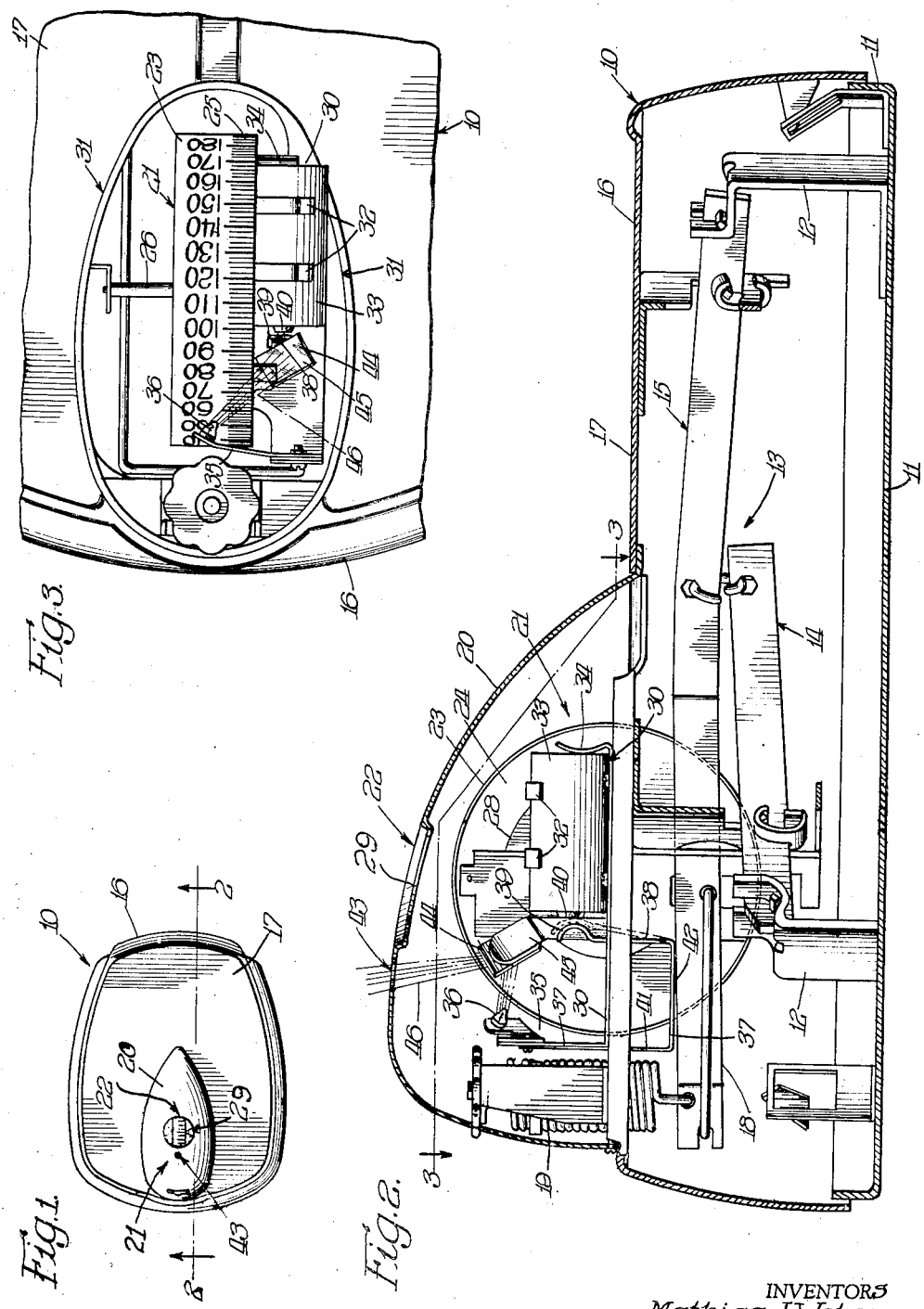
INVENTORS
Mathias J. Weber
Russell E. Vanderhoff
BY Spencer, Marzall, Johnston & Cook
Attys.

Oct. 12, 1943.                M. J. WEBER ET AL                2,331,642
                                WEIGHING SCALE
                            Filed Oct. 21, 1940            3 Sheets-Sheet 2

INVENTORS
Mathias J. Weber
Russell E. Vanderhoff
BY Spencer, Matzall, Johnston & Cook
Attys.

Oct. 12, 1943.  M. J. WEBER ET AL  2,331,642
WEIGHING SCALE
Filed Oct. 21, 1940  3 Sheets-Sheet 3
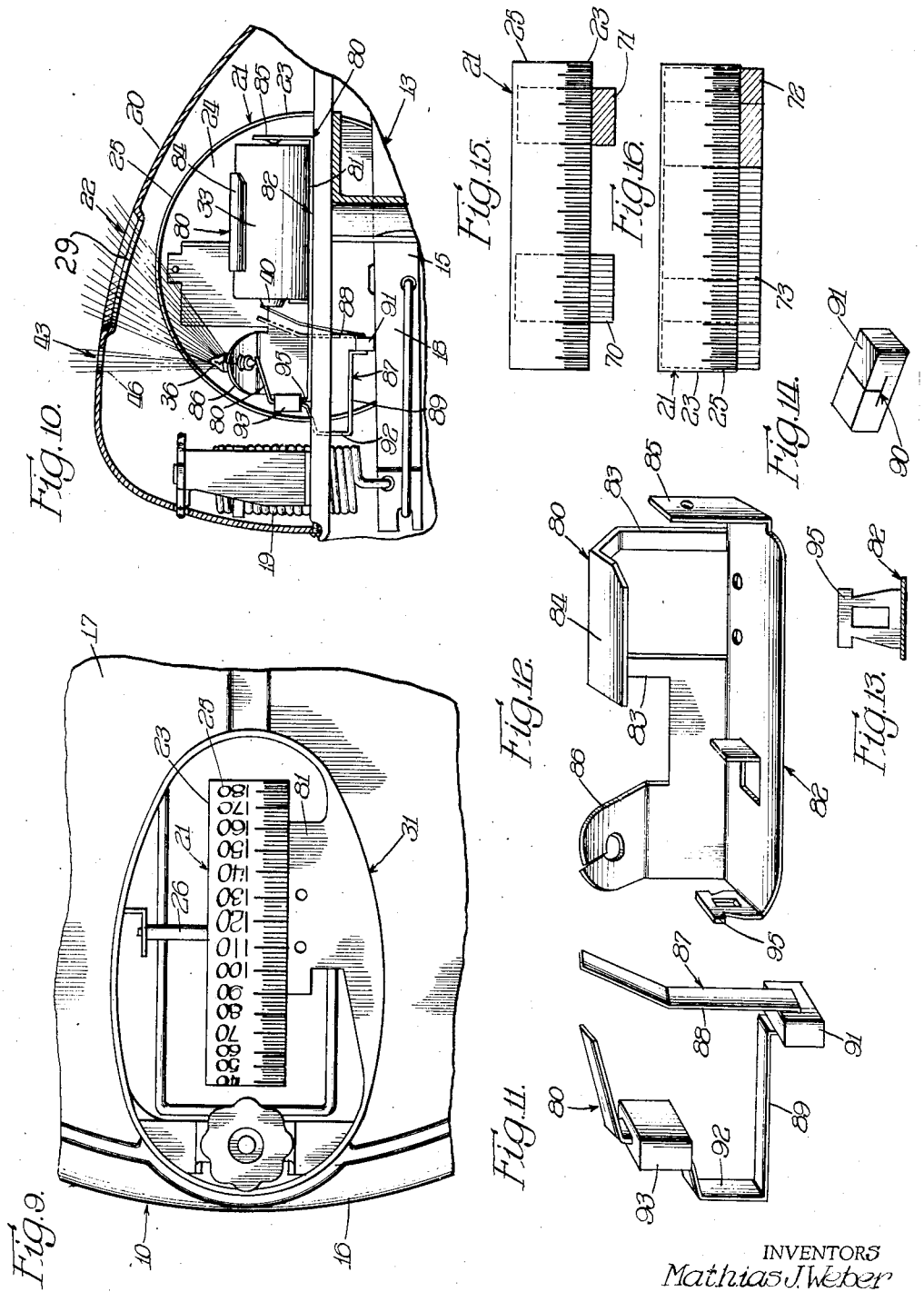
INVENTORS
Mathias J. Weber
Russell E. Vanderhoff
BY
Spencer, Marzall, Johnston & Cook
Attys Patented Oct. 12, 1943

2,331,642

UNITED STATES PATENT OFFICE 2,331,642

WEIGHING SCALE

Mathias J. Weber, Chicago, and Russell E. Vanderhoff, Oak Lawn, Ill., assignors to Continental Scale Corporation, Chicago, Ill., a corporation of Delaware Application October 21, 1940, Serial No. 362,042

4 Claims. (Cl. 177—311)

This invention relates in general to weighing scales, and more particularly to scales having a weight carrying platform relatively close to the floor and adapted for use as a personal weight scale, although the invention is not limited to the specific use to which the scale may be put.

An important object of the present invention is the provision of signal means, the operation of which is controlled by the mechanism of a weighing scale, whereby a visible or audible signal may be brought into operation when the scale weighing mechanism is at a predetermined weighing position.

Another important object of the invention is the provision of signal means which is operated by the weighing means whereby a signal is given when the weighing means arrives at or is at a predetermined position.

Another object is the provision of a personal weighing scale having signal means operable, when a predetermined weight is applied to the scale platform, to attract the attention of a person being weighed and instantly advise whether his weight is within or beyond his proper weight range.

Another object is to utilize color means as a signal of the character mentioned in weighing scales; a further object being to utilize a plurality of colors arranged for successive presentation to view by the operation of the weighing mechanism.

Still another object of the invention is the provision of signaling means to indicate to a person being weighed whether his weight is within the proper weight range, the scale indicating means or parts thereof causing a signal, in the present instance one or more lights of predetermined colors, to indicate the proper weight range, there being different colored lights to indicate whether the weight of a person being weighed is within or without the proper or preferred weight range.

Another object of the invention is the compact location, simple construction and novel arrangement of the various parts and the manner, mode, and location in which the parts operate and are positioned, as hereinafter more fully revealed.

Still another object is the provision of new and improved means in the form of a switch to cause electrical operation of a signal when a weight is applied to the weighing scale and to disable the signal when the weight is removed from the scale.

Numerous other objects and advantages will be apparent throughout the progress of the following specification.

The accompanying drawings illustrate a selected embodiment of the invention and the views therein are as follows:

Fig. 1 is a top plan view of one form of a weighing scale and embodying the invention;

Fig. 2 is a detail longitudinal sectional view on the line 2—2 of Fig. 1;

Fig. 3 is a detail plan section on the line 3—3 of Fig. 2;

Fig. 9 is a detail plan view of the scale showing the unit support;

Fig. 10 is a detail vertical sectional view showing the unit mounted in position and in engagement with the weighing scale mechanism;

Fig. 11 is a detail perspective view of the spring switch;

Fig. 12 is a detail perspective view of the supporting unit;

Fig. 13 is a view showing the manner in which the switch is fastened to the support;

Fig. 14 is a detail perspective view showing the construction of one of the rubber plugs;

Fig. 15 is a detail view showing short strips secured beneath the graduated dial; and Fig. 16 is a modified form of strip mechanism which may be successively used with a rotating cylindrical dial.

Figure 5:
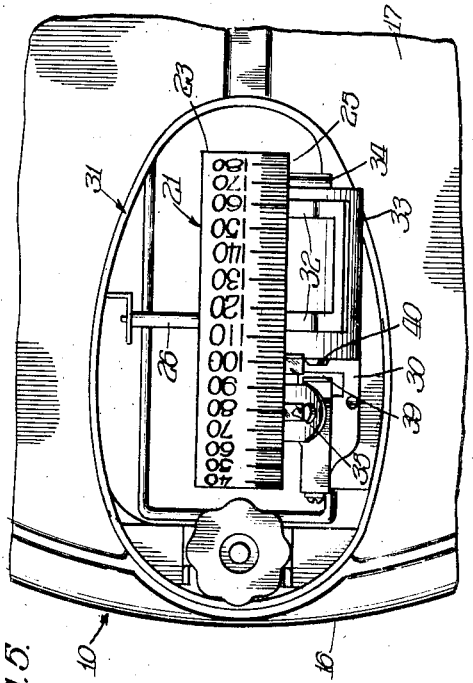
Fig. 5 is a detail plan section of the device shown in Fig. 4.

The weighing scale herein shown for the purpose of illustrating the invention may comprise a scale of the type wherein the operating weighing mechanism is mounted upon and beneath the platform and supported by a suitable base, although the invention is applicable to any type of scale.

The weighing mechanism and the mechanism for indicating the weight applied on the weighing platform may comprise mechanism as shown and claimed in our United States Letters Patent No. 2,310,560 issued February 9, 1943, upon our co-pending application Serial No. 227,493 filed August 30, 1938, wherein the indicating means comprises a stationary pointer and a dial comprising a rotary drum. Our present invention may also be applied in scales of the stationary dial type wherein a movable pointer cooperates with a stationary dial as shown in our U. S. Patent No. 2,098,345, granted November 9, 1937, or wherein a movable dial rotates behind a stationary pointer as in United States Letters Patent No. 2,066,243 granted December 29, 1936, to Richard C. Barler and Carl Burkhard.

The signaling mechanism comprising the present invention is adapted to cooperate with scale weighing indicating mechanism, either of the type wherein a dial moves with respect to a stationary pointer, or where a pointer moves with respect to a stationary dial.

The invention comprises, in general, signaling means to indicate to a person being weighed that his range of weight is beyond a certain predetermined range. The signaling means in the present embodiment may comprise a light, although the invention is not to be limited in this respect, whereby to indicate by means of a green light that the weight of a person on the weighing platform is within a predetermined range, as well as to indicate, as by means of a red light, that the person's weight is not within the proper weight range; for instance, should a person weigh 165 pounds and his correct and proper weight is 165 pounds, a green light will appear as soon as the person being weighed steps upon the weighing platform. Should the person's weight, however, be other than 165 pounds, a red light will be actuated whereby he will know immediately that he is overweight.

In place of two indicator lamps, a single lamp, operable when the danger zone is reached, may be utilized. For example, the green light may be dispensed with leaving only a red light to indicate the danger point has been reached, the red light coming into view when the scale registers other than the predetermined weight at which the signal means is calibrated for operation. It is to be understood, however, that the arrangement may be reversed whereby underweight instead of overweight may be indicated as the danger point, all according to a predetermined system to cause operation of the signaling means at the proper time. Moreover, a plurality of different signals may operate successively. For instance, a white light may come on after a weight of a few pounds is on the scale, then an amber light may appear followed by a green light and a red light whereby several weight ranges may be indicated.

The particular scale herein shown is of the kind previously mentioned, being the relatively low platform type adapted for use as a personal weight scale as disclosed in our aforesaid United States Letters Patent No. 2,310,560. To illustrate our present invention, the drawings show a scale 10 having a base 11 upon which the weighing mechanism is supported, Fig. 2. The base 11 has mounted thereon upstanding bearing plates 12 which act as bearing points for the pivots of the weighing mechanism 13. The weighing mechanism may include a plurality of lever means 14 and 15 mounted in the upper part of the housing 16. The scale construction is such that the forward end or part of the leverage weighing mechanism, indicated at 15, lowers or depresses when a weight is applied on the platform 17 of the housing 16. The end 18 of a part of the weighing mechanism 13 is suspended on a spring 19 which is anchored between an indicating casing 20 and a part on the housing 16. The leverage mechanism 13 is such that a weight on the platform 17 may be measured against the deflection of the spring.

The base 11 and housing 16 preferably comprise drawn sheet metal parts, the housing 16 having a platform portion adapted to receive the feet of a person to be weighed. The dome-like casing 20 is also drawn sheet metal and extends upwardly from the platform 17 at one end of the shell 16. The platform may be strengthened by a ridge under the shell to provide a longitudinal strut or buttress for strengthening the platform against bending deflection under the influence of a weight applied thereto for measurement on the scale, all as disclosed in said United States Letters Patent No. 2,310,560.

Indicating means 21 are mounted in position in the casing and are visible through an opening 22 formed in an upper surface of the dome-like casing 20. This indicating means or mechanism 21 may comprise a cylindrical element 23 having an end wall 24, the cylinder 23 carrying on its outer surfaces graduated weight scale means or dial 25 in the form of a strip extending circumferentially about the periphery of the cylinder with its ends fastened together in overlapping relationship and fixed to the cylinder. The cylinder 23 is journalled in the shell 16 in position to rotate opposite the opening or window 22. The element 23 is carried on a transverse shaft 26 which is rotatably mounted or journalled in suitable bearings carried by the scale housing 16. The shaft 26 carries a pinion (not shown), the teeth of which mesh with a rack 28 which is mounted and guided for slidable movement drivingly to engage the pinion. The rotatable indicator element 23 may be driven by the rack 28 which is operatively connected to and driven by the weighing mechanism 13 so that when the weighing mechanism moves downwardly, the rack 28 will also move downwardly. The rotatable scale carrying element 23 will be rotated during this downward movement of the rack 28 to indicate pounds according to the weight on the platform. The weight indicating means 21 includes a pointer 29 which cooperates with the graduated scale dial or indicator 25. The construction and operation of the weighing mechanism, the rack, and the indicating means are clearly disclosed and claimed in the aforesaid Letters Patent No. 2,310,560. The invention contemplates the use of scale mechanism generally for controlling the operation of the signaling means to indicate to the person being weighed whether or not his weight is within or without a predetermined weight range.

The signal mechanism, as disclosed in the various figures, comprises a support 30 mounted adjacent the cylindrical indicating member 23 at the edge of an opening 31 formed in the top of the housing 16 and through which opening the indicating means projects upwardly into the indicating casing 20. The support 30 may comprise a flat member fixed to an upper surface of the housing 16 and may include integral spring fingers 32 to support an electric dry cell battery 33. A contact member 34, adapted to make electrical contact at one end of the battery, is provided at one end of the battery and forms the ground therefor. This contact member 34 may be an integral part of the support 30, if desired, as shown in Figs. 2 to 5. A bracket 35, Fig. 2, to receive an electric light bulb or globe 36, may also be fixed to the support 30, and this bracket is constructed to receive the threaded end of the lamp 36. A contact element 37 which is U-shaped, Figs. 2 to 5, is secured to a part of the support 30 but is insulated therefrom, a part of this contact element 37 making electric contact with the lamp 36. A leg 38 of the U-shaped member 37 carries a contact point 39 which is adapted to engage the contact or pole 40 of the battery 33. The leg 38 of the member 37 is connected to a leg 41 which is spaced therefrom by a lower connecting portion 42. The member 37 is made of relatively springy material and is exceedingly light in weight so as not to affect in any way the proper operation of the scale. The bottom portion 42 of the member 37 rests upon the upper surface of the depressible part 15 of the weighing mechanism 13 and is operated by this part.

During normal position of the scale, that is, when no weight is applied to the scale, the outer end 18 of the part 15 of the leverage mechanism 13 is in engagement with the part 42 of the member 37 and keeps the contact 39 out of engagement with the battery pole 40. However, when a weight of a few or several pounds is applied to the weighing platform 17, the outer end 18 of the leverage mechanism 13 becomes depressed. The movement of this member permits the springy contact carrying member to move toward the battery pole or contact 40. Therefore, the contact 39 will engage the contact or pole 40, and cause electric current to pass from the battery to the lamp 36, whereupon the lamp becomes lighted. The lamp 36 may be so positioned that it will illuminate the upper part of the rotatively mounted graduated dial 25, whereby the dial will be seen easily through the opening 22.

The U-shaped member 37 is made of relatively flexible material so as to be bent easily so as to make contact properly with the battery at the proper desired time, whereby the lamp will be lighted. The lamp, however, will be lighted only at the desired predetermined weighing point. In other words, the U-shaped member 37 is adapted to be configurated so as to cause contact with the battery when a part of the weighing leverage 15 has lowered a predetermined amount. The member 37 therefore may be adjusted so that when the end 18 of the leverage mechanism 15 is depressed a certain amount, contact will be made. The person being weighed, therefore, may look through the opening 22 and see the poundage indicated by the illuminated dial. The opening 22 may have a magnifying glass thereover to magnify the numbers on the graduated strip or dial 25.

In order to inform a person at a glance that he is beyond his weight range, or, in other words, overweight, a red light will come into view through the aperture 43 provided in the top of the casing 20. The red light will appear through the aperture 43 by the provision of a suitable red substance or material in or behind the opening 43 by means of light being reflected from the lamp 36. A reflector element 44, Figs. 2 and 3, is mounted on a bracket 45 rigid with a part of the scale housing 16 and placed at such an angle that it will receive the light from the lamp 36 and reflect the light rays 46 through the aperture 43. Thus, when the person being weighed has reached a poundage beyond his normal or desired weight range, he will see a red light through the aperture in the housing and be informed at a glance that the danger point of weight increase has been reached.

Figures 4, 6:
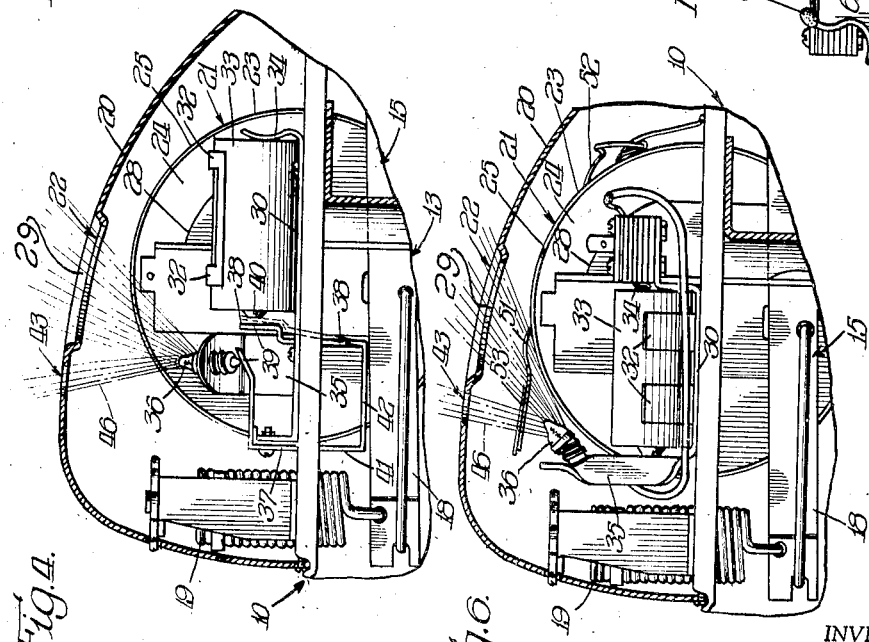
Fig. 4 is a detail vertical sectional view through the scale housing in which the indicating means is arranged and showing a modified form of signaling device.
Fig. 6 is a detail vertical sectional view through the scale indicating housing showing another modified form of signaling device.

In Figs. 4 and 5, the lamp 36 is shown positioned directly beneath the sight aperture 43 so as to allow the direct rays of the lamp to pass directly through the opening. If desired, the lamp 36 may be located in a position underneath the circumference of the cylinder 23, which may be made of transparent or translucent material whereby the direct rays 46 from the lamp will pass through the transparent indicator and then through the aperture 43.

Figure 7:
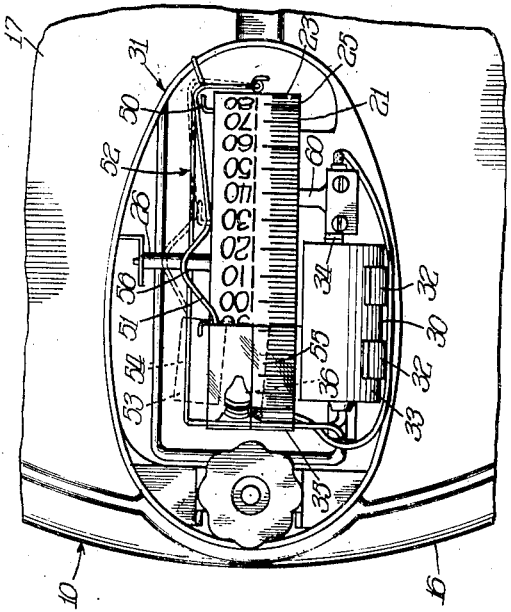
Fig. 7 is a detail plan section of the device shown in Fig. 6.
Figure 8:
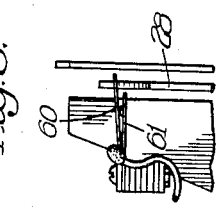
Fig. 8 is a modified form of circuit making and breaking device which may be used in connection with the present invention to operate the signal means.

In Figs. 7 and 8, a modified form of construction is employed whereby the lamp 36 is positioned outside of the cylinder 23 but in a position so that the light rays 46 will pass directly through the opening 43.

It may be desirable, also, to have both a red and a green signal to indicate that a person's weight is within or without the proper weight range. In other words, a green light will be indicative of "Go," indicating that the weight on the scale is within the proper weight range, while the red light will be indicative of "Stop," indicating that the weight on the scale is beyond or over the proper weight range.

One form of this latter embodiment is shown in Figs. 6 and 7, wherein the cylindrical member 23 is provided with outstanding pins or arms 50 on one side of the peripheral edge of the cylinder and adapted for engagement with the leg or arm 51 of a pivotally mounted signal element 52. The signal element 52 may have, at the upper end of its leg 51, a transparent rectangular part 53 divided in two indicating colors 54 and 55, the part 54 being green and the part 55 being red. The pivoted member 52 is adapted to be swung on its pivot by a pin 50 predeterminately positioned so as to bring either the red or the green color into view at the proper time. Thus, when a weight is applied to the platform and the indicating means starts to rotate, a pin 50 will engage a straight side of the leg 51 and maintain it in that predetermined position. However, as soon as the dial has moved past the weight priorly determined, the pin 50 will no longer be in engagement with the leg 51 because it will lie in the recess formed by the bend 56, Fig. 7, and therefore cause the pivoted member 52 to move on its pivot and shift the red transparent part into position above the lamp 36. The member 52 is preferably urged toward the periphery of the indicating mechanism by means of a spring but its movement toward the indicating mechanism is limited by a proper stop so as not to interfere with the normal operation of the indicating dial. A signal is thus immediately flashed as soon as a person steps upon the dial, whereupon the person may be informed at a glance whether he is within the proper weight range. As soon as the color green appears through the opening 43, the person on the scale will know that he need not be concerned with his weight, but as soon as the red color appears through the opening 43, he is immediately informed that he has reached his weight limit and therefore should cut down on his diet to reduce his weight. As soon as a weight is applied to the platform, the cylindrical member 23 will start to rotate, and when a pin 50 engages the leg 51, it will bring the green part 54 over the lamp 36. However, when the predetermined pre-set maximum weight is indicated, the pin 50 will leave the arm because of the bend 56, causing the red color 55 to come into view.

The device is capable of bringing the respective colors in view more than once by applying additional pins 50 to the cylinder or by applying additional bends 56 in the arm. The scale may thus be used to signal various weights, making the scale adaptable for use by several persons of different weights. For instance, the various lights may come on to signal the weights within various ranges. For example, should the scale be in general family use, one pin could be set for the father, one for the mother, and others for the children.

In Fig. 8 there is disclosed a modified form of mechanism for controlling the operation of the light circuit for the lamp 36 shown in Figs. 5 and 6. This construction includes a pair of spaced-apart flexible fingers 60 and 61 which are adapted, when brought together, to complete the light circuit to the lamp. The finger 60 may be longer than the finger 61 and is adapted to engage the rack 28 and be held up out of engagement with the finger 61. However, when a weight is applied to the platform and the rack 28 lowers a predetermined amount, the spring finger 60 will lower and make contact with the member 61, thereby causing the circuit to be completed and causing the lamp 36 to be lighted. The members 60 and 61 may be so constructed as to cause contact to be made when the rack 28 is at a predetermined position, and inasmuch as the rack 28 causes the operation of the cylindrical member 23, the effect is the same as previously described as regards the member 37. In other words, the upward and downward movement of the rack 28 performs the same function as the lowering of the arm 15 and the rotative movement of the cylinder 23. The fingers 60 and 61 are spaced a predetermined distance apart, but the lowering movement of the rack 28 causes contact to light the lamp 36. This arrangement is equivalent to the depression of the lever 15 and the rotative movement of the cylinder and causes the lamp to light, similarly to the lighting of the lamp by mechanism shown in Figs. 2 to 5.

Another form of signaling means, Fig. 15, may comprise the aforesaid light 36, which is illuminated by applying a weight on the scale, cooperating with colored tabs or strips mounted adjacent a peripheral edge of the rotary dial, the lamp 36 being so positioned as to be underneath the existing tabs. The tabs may comprise colored transparent members 70 removably positioned underneath the gauge band which acts as the dial. Thus, when a person steps on the scale a green tab or band will come into position through which light may pass. However, additional transparent tabs 71 of a red color may be positioned at the point indicated as the maximum weight, whereby the light will appear red through the opening 43 after the predetermined maximum weight point has been set. Moreover, instead of using the tabs 70 and 71, bands or quadrants 72 and 73, Fig. 16, may be substituted. These bands are adapted to be set so that a continuous predetermined colored portion will be over the light until the maximum weight is reached, at which time the red band will be in position.

A simple, efficient, inexpensive, compact unit 80 incorporating the electric circuit and switch means may be removably applied to a part of the scale, Figs. 9 to 13. The unit 80 may be applied in position by merely fastening the unit to a ledge 81, Fig. 9, formed on the housing 16 and extending inwardly of the opening 31 and arranged beneath the indicating means, housing or casing 20, Figs. 10 to 13.

This unit 80 comprises a bottom support 82 which is mounted on top of the ledge 81 and fastened thereto by one or more screws. Upstanding arms 83, Fig. 12, and a top 84 each integral with the support 82 carry the dry cell or battery 33 in proper position. An integral upstanding finger 85, integral with the support 82 forms an end contact or ground for the battery. A bracket 86 forming an integral part of the support 80 has a central opening to receive the threaded end of the lamp 36. The metal at the end of the opening may be split and bent up to threadedly receive the lamp.

A switch 87, Fig. 11, in the form of a thin flat flexible resilient strip of metal is bent to the proper form to make constant electrical contact with the lamp 36 and movable contact with the pole 40 of the battery 33, Figs. 11 to 13. The upper free leg 88 of the switch 87 passes through a slot in the base of the support 82 and makes contact with the pole 40, normally being urged toward the pole because of the resiliency or springiness of the metal, but held away from contact by the end 18 of the lever 15 when no weight is on the scale. The bottom part 89 passes through a T-shaped slit 90 in a rubber plug 91, Fig. 14, which rests on the lever 15 when the scale is in inoperative position and is insulated from the weighing mechanism by the plug 91. The T-shaped slit 90 provided in the rubber plug 91, Fig. 14, permits the rubber plug to be spread apart to open the slit sufficient so that the rubber plug may be applied easily to the bottom part 89 of the member 87. The upwardly extending bent leg 92 of the switch member 87 passes through a rubber plug 93, there being a slit provided in this plug to permit the passage of the flat resilient material through the slit. The upper end of the member 92 is bent laterally over the top of the plug 91 so as to make constant resilient contact with the lamp 36, Figs. 10 and 11. The rubber plug 93, Fig. 13, is provided with an additional slit to receive an upstanding flange 95, Fig. 12, on the support 82 whereby the entire switch element 87 will comprise in effect an integral part of the unit 80. The entire unit 80 therefore, which includes the switch element 87, the lamp 36, the battery 33, and the support 82, may be quickly and readily applied to the ledge 81 by merely tightening one or more screws. The switch element 87, because of the rubber plugs 91 and 93, is insulated from the support 82 thus allowing for the making of proper electrical circuit when the contact arm 83 is in engagement with the pole 40 on the battery. Contact is adapted to be made when a weight is applied on the scale platform because the lowering movement of the weighing lever 15 will permit the resiliency of the switch 87 to cause it to move into contact with the battery, the contact no longer being forcibly held away from the battery by the lever 15.

The switch 87 is adapted to be operated to make proper contact with the battery when the indicating means records a few pounds weight on the scale so as to light the lamp 36. As the weight on the scale platform increases by the application of the full weight on the scale of the person being weighed, the colored signaling means will come into position over the lamp 36, and therefore signal to the person being weighed that his weight is or is not within the proper weight range, all in accordance with a predetermined plan. Transparent colored members, being removably attached to the cylindrical drum 25, pre-set at various positions to indicate different pound indications, come into view successively in accordance with a predetermined setting.

The invention broadly consists of means controlled by the weighing mechanism to bring into view one or more color indications to indicate weight ranges of one or more persons; and several colors may be brought into view successively to indicate or determine various weight ranges of a single person, or the weight range of several persons. It has been found convenient to apply the colored strips or bands beneath the graduated dial strip 25 whereby the strips or bands will be frictionally held in position between the upper surface of the drum or cylinder 23 and the under surface of the graduated dial 25.

The invention contemplates the provision of signaling means to indicate to a person on the platform whether or not his weight is within the proper range. When a green signal shows, or when there is no signal at all, he knows that his weight is within the proper range, but when a red signal shows, he will know that his weight is not within the proper range. No signal at all, or one or more colored signals, other than red, if the multiple color system is to be used, is indicative of the proper weight range, but a red signal indicates that he is not within his proper weight range.

The invention contemplates the use of signaling means of the type disclosed, whether the dial be of the cylindrical type or whether it be of the disk type. Moreover, the invention further contemplates the use of either a movable dial and a stationary finger, or a stationary dial and a movable finger, the invention being just as susceptible for operation by an indicating finger or pointer, as by a moving dial. Moreover, instead of using a light for a signal, it is, of course, understood that any other signaling means, such as a bell or a buzzer, may be substituted for the light with similar success.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. In a weighing scale comprising a pair of relatively movable frames forming a platform and a base, weighing mechanism supporting the platform yieldingly on the base, said mechanism being movable with respect to said frames in response to the application of weight on said platform, said weighing mechanism including weight indicating means visible to a person standing on the platform, said indicating means comprising dial and pointer members, one of said members being fixed on one of said frames and the other member being relatively movable with respect to the fixed member by operation of said mechanism under the influence of a weight on said platform, the combination, with said frames and said weighing mechanism, of warning means for showing that the weight on the platform is within a predetermined weight range, one of said frames being formed with an opening and said warning means comprising a signal member shiftable on one of said frames by operation of said mechanism into position to transmit a visible signal through said opening upon illumination of said member, a light source on one of said frames in position to illumine the signal member, and means operable by said mechanism for energizing said light source when more than a predetermined minimum weight is on the platform.

2. In a weighing scale comprising a pair of relatively movable frames forming a platform and a base, weighing mechanism supporting the platform yieldingly on the base, said mechanism being movable with respect to said frames in response to the application of weight on said platform, said weighing mechanism including weight indicating means visible to a person standing on the platform, said indicating means comprising dial and pointer members, one of said members being fixed on one of said frames and the other member being relatively movable with respect to the fixed member by operation of said mechanism under the influence of a weight on said platform, the combination, with said frames and said weighing mechanism, of warning means for showing that the weight on the platform is within a predetermined weight range, one of said frames being formed with an opening and said warning means comprising a light source on one of said frames in position to project a light ray through said opening, a colored translucent signal member shiftable on one of said frames by operation of said mechanism into position in the path of said light ray whereby to color the light ray projected through said opening, and means operable by said mechanism for energizing the light source when more than a predetermined minimum weight is on the platform.

3. In a weighing scale comprising a pair of relatively movable frames forming a platform and a base, weighing mechanism supporting the platform yieldingly on the base, said mechanism being movable with respect to said frames in response to the application of weight on said platform, said weighing mechanism including weight indicating means visible to a person standing on the platform, said indicating means comprising dial and pointer members, one of said members being fixed on one of said frames and the other member being relatively movable with respect to the fixed member by operation of said mechanism under the influence of a weight on said platform, the combination, with said frames and said weighing mechanism, of warning means for showing that the weight on the platform is within a predetermined weight range, one of said frames being formed with an opening and said warning means comprising a light source on one of said frames in position to project a light ray through said opening, a signal member having a plurality of contrastingly colored portions shiftable on one of said frames by operation of said weighing mechanism into position progressively presenting said colored portions in place to transmit a correspondingly colored signal through said opening, and means operable by said mechanism for energizing the light source when more than a predetermined minimum weight is on the platform.

4. In a weighing scale comprising a pair of relatively movable frames forming a platform and a base, weighing mechanism supporting the platform yieldingly on the base, said mechanism being movable with respect to said frames in response to the application of weight on said platform, said weighing mechanism including weight indicating means visible to a person standing on the platform, said indicating means comprising dial and pointer members, one of said members being fixed in one of said frames and the other member being relatively movable with respect to the fixed member by operation of said mechanism under the influence of a weight on said platform, the combination, with said frames and said weighing mechanism, of warning means for showing that the weight on the platform is within a predetermined weight range, one of said frames being formed with an opening and said warning means comprising a light source mounted on one of said frames, means to energize said light source when a weight is on the platform, mirror means on one of said frames in position to reflect a light ray from said source through said opening in position visible to a person on said platform, and a colored translucent signal member shiftable on one of said frames by operation of said weighing mechanism into position lying in the path of said light ray whereby to tint the same in accordance with the color of said translucent member.

MATHIAS J. WEBER.
RUSSELL E. VANDERHOFF.